Feb. 7, 1956  R. E. DUPLESSIS  2,733,459
LASTING MACHINES

Filed Jan. 15, 1952  11 Sheets-Sheet 1

Inventor
Rene E. Duplessis
By his Attorney
Thomas J. Ryan

Inventor
Rene E. Duplessis
By his Attorney
Thomas J. Ryan

Inventor
Rene E. Duplessis
By his Attorney
Thomas J. Ryan

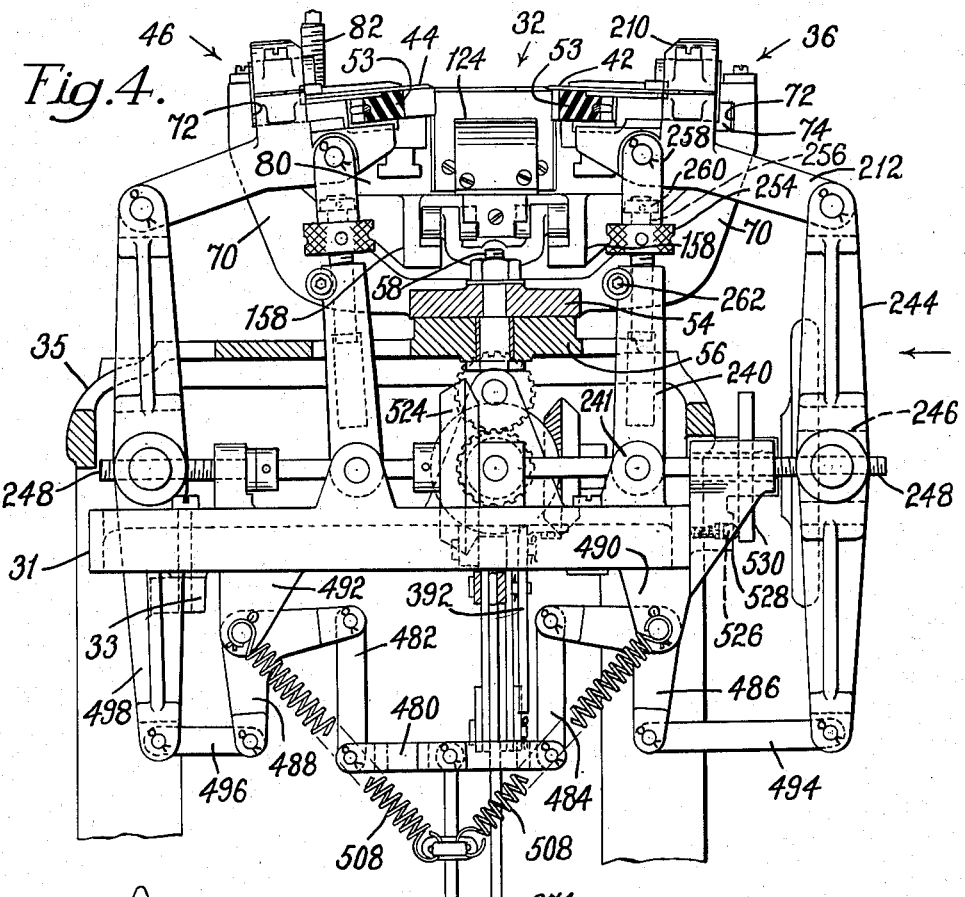
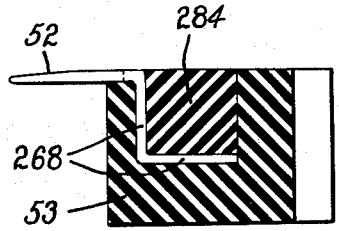
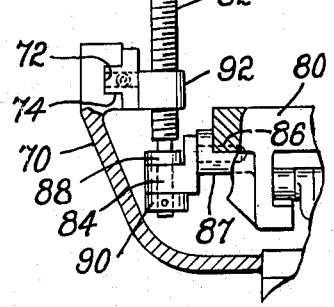
Feb. 7, 1956  R. E. DUPLESSIS  2,733,459
LASTING MACHINES
Filed Jan. 15, 1952  11 Sheets-Sheet 4
Fig. 4.
Fig. 5.
Fig. 7.
Inventor
Rene E. Duplessis
By his Attorney
Thomas J. Ryan Feb. 7, 1956  R. E. DUPLESSIS  2,733,459
LASTING MACHINES
Filed Jan. 15, 1952  11 Sheets-Sheet 6
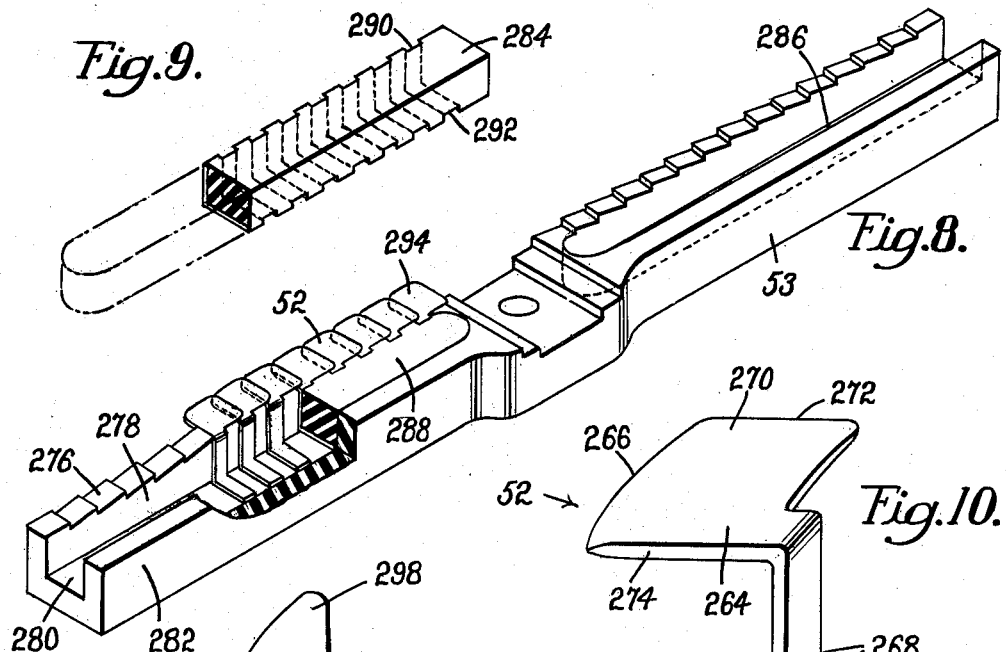
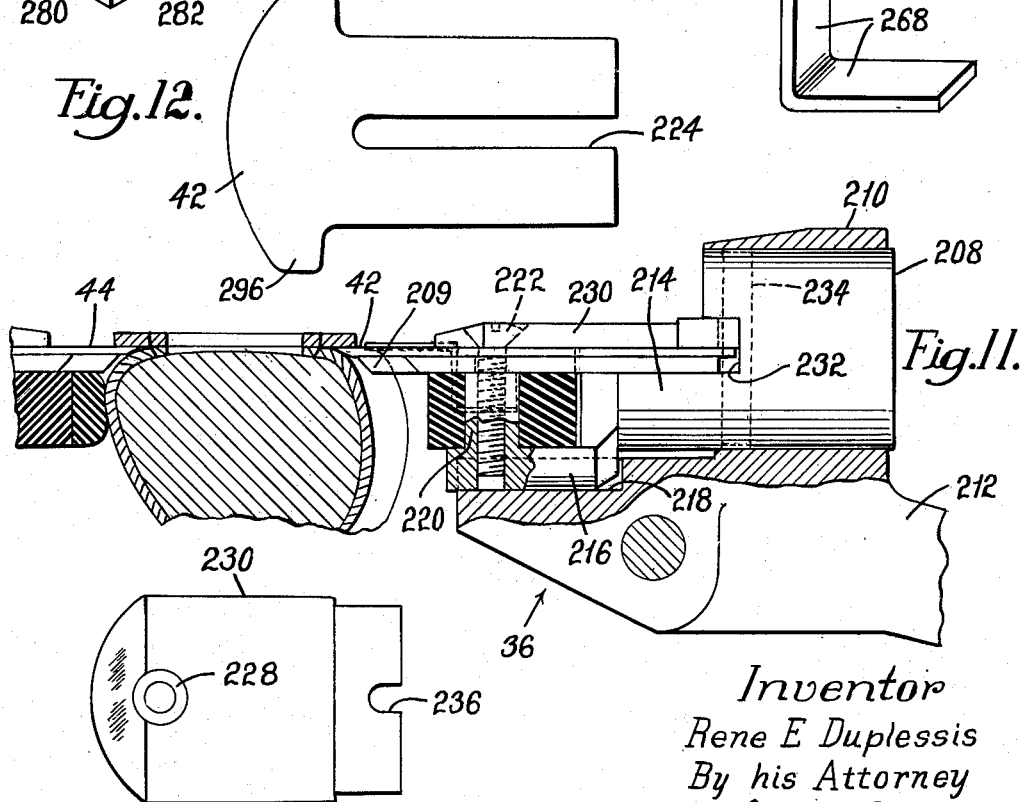
Inventor
Rene E Duplessis
By his Attorney
Thomas J Ryan

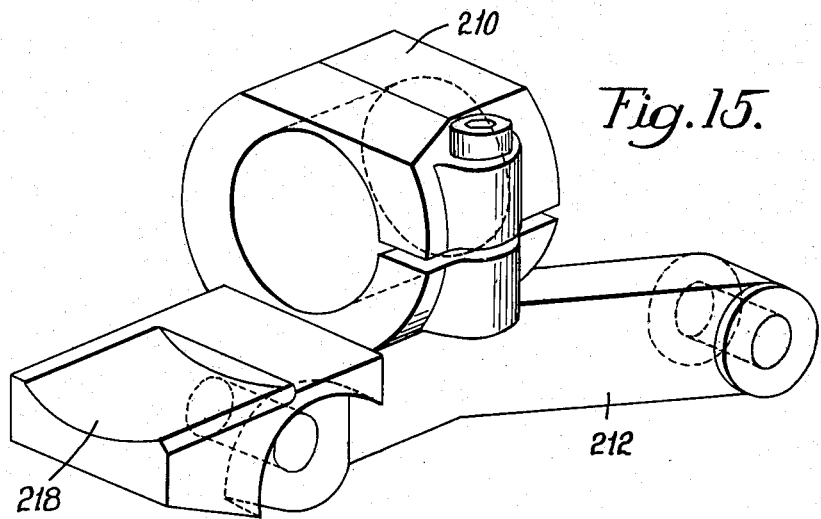
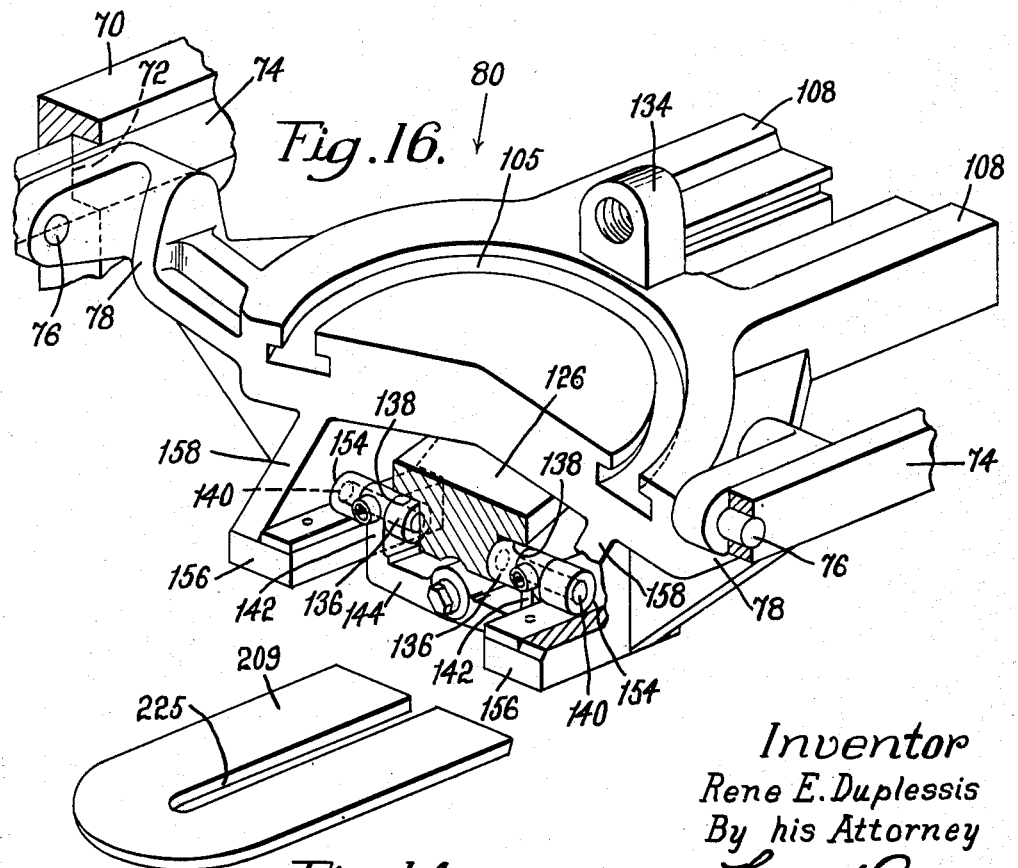

Feb. 7, 1956  R. E. DUPLESSIS  2,733,459
LASTING MACHINES
Filed Jan. 15, 1952  11 Sheets-Sheet 8
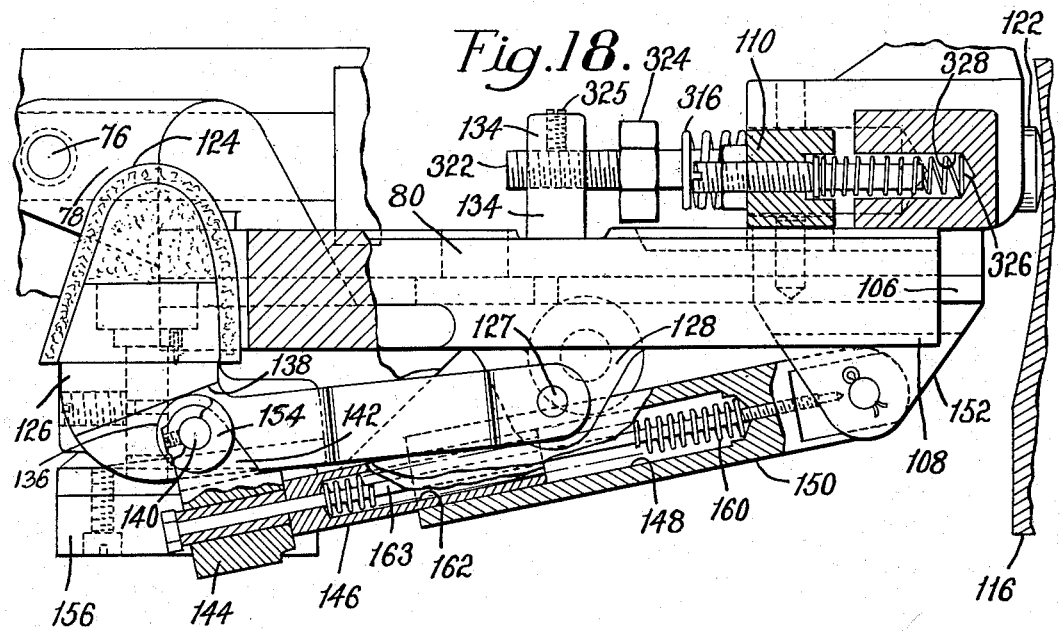
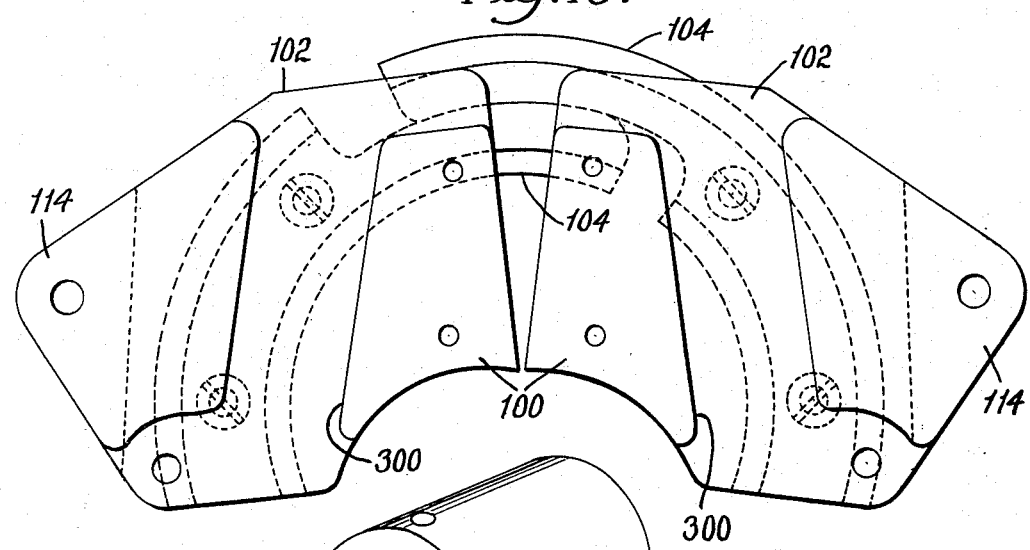
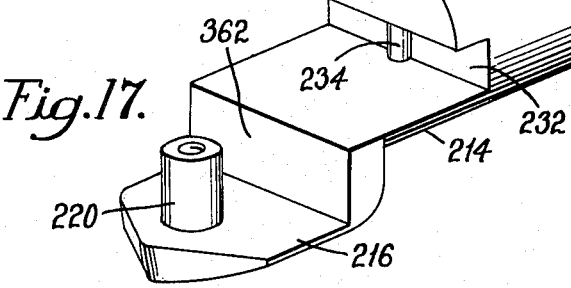
Inventor
Rene E. Duplessis
By his Attorney

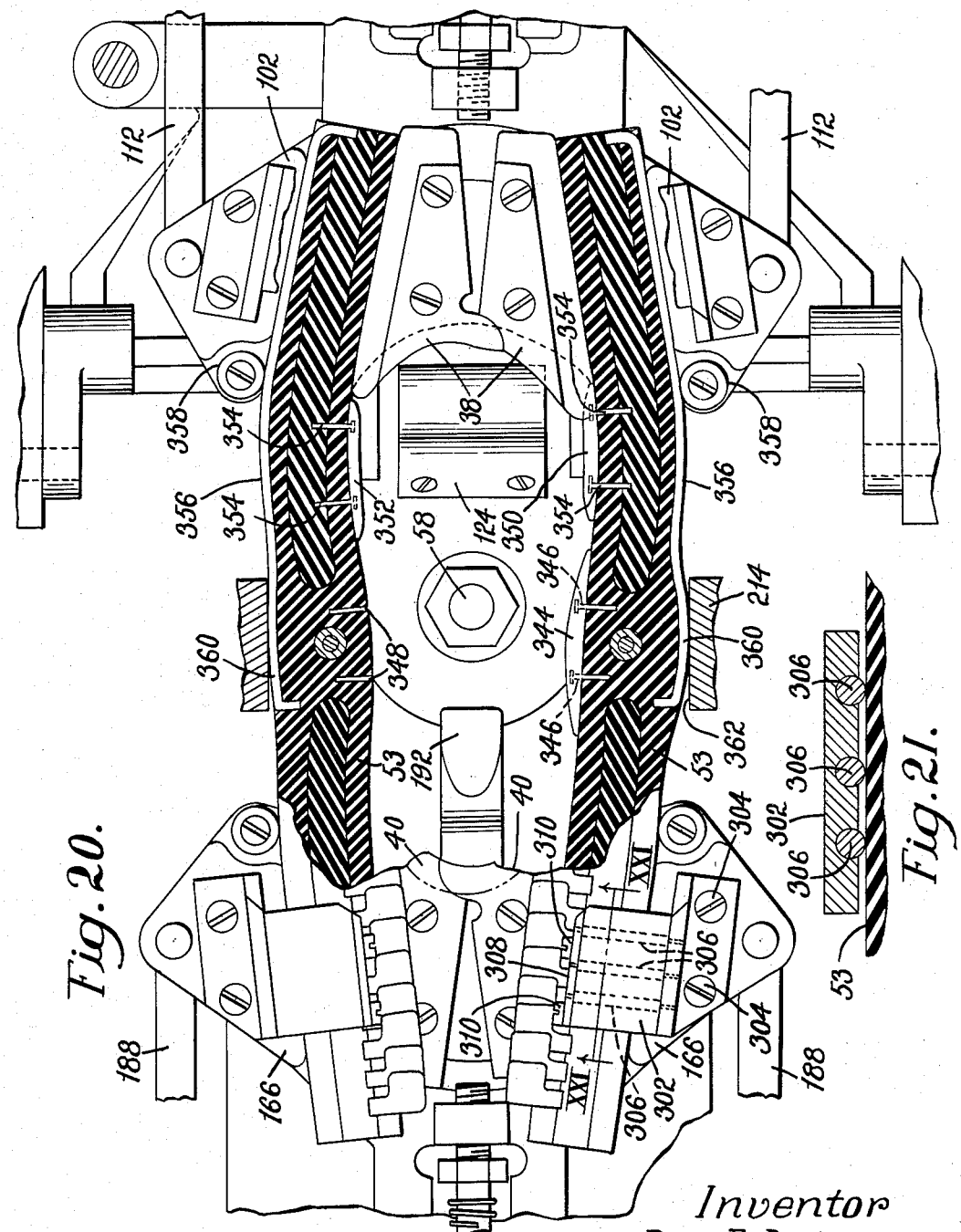

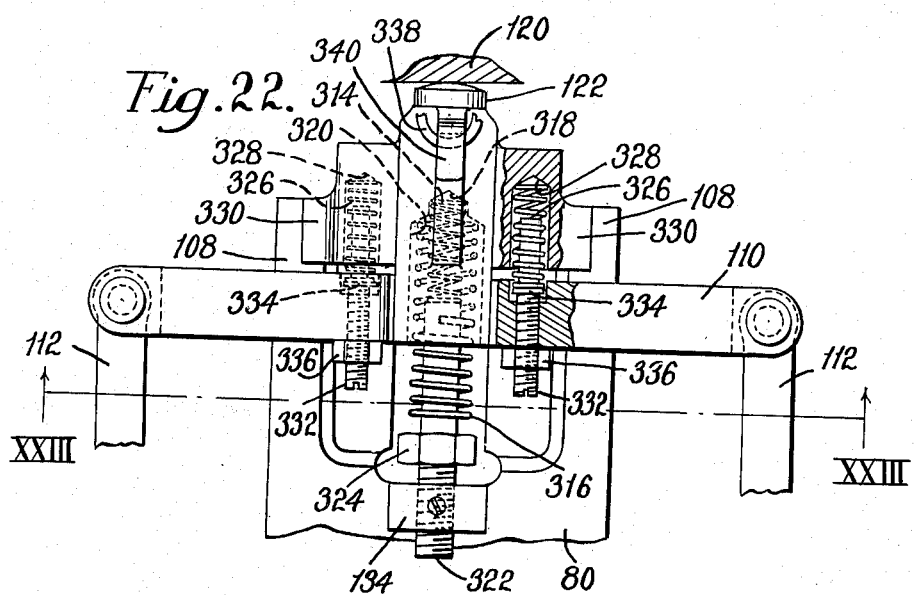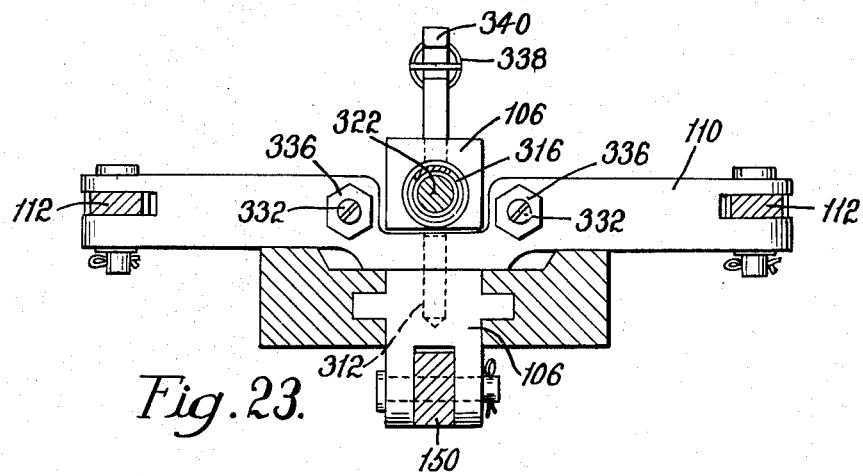

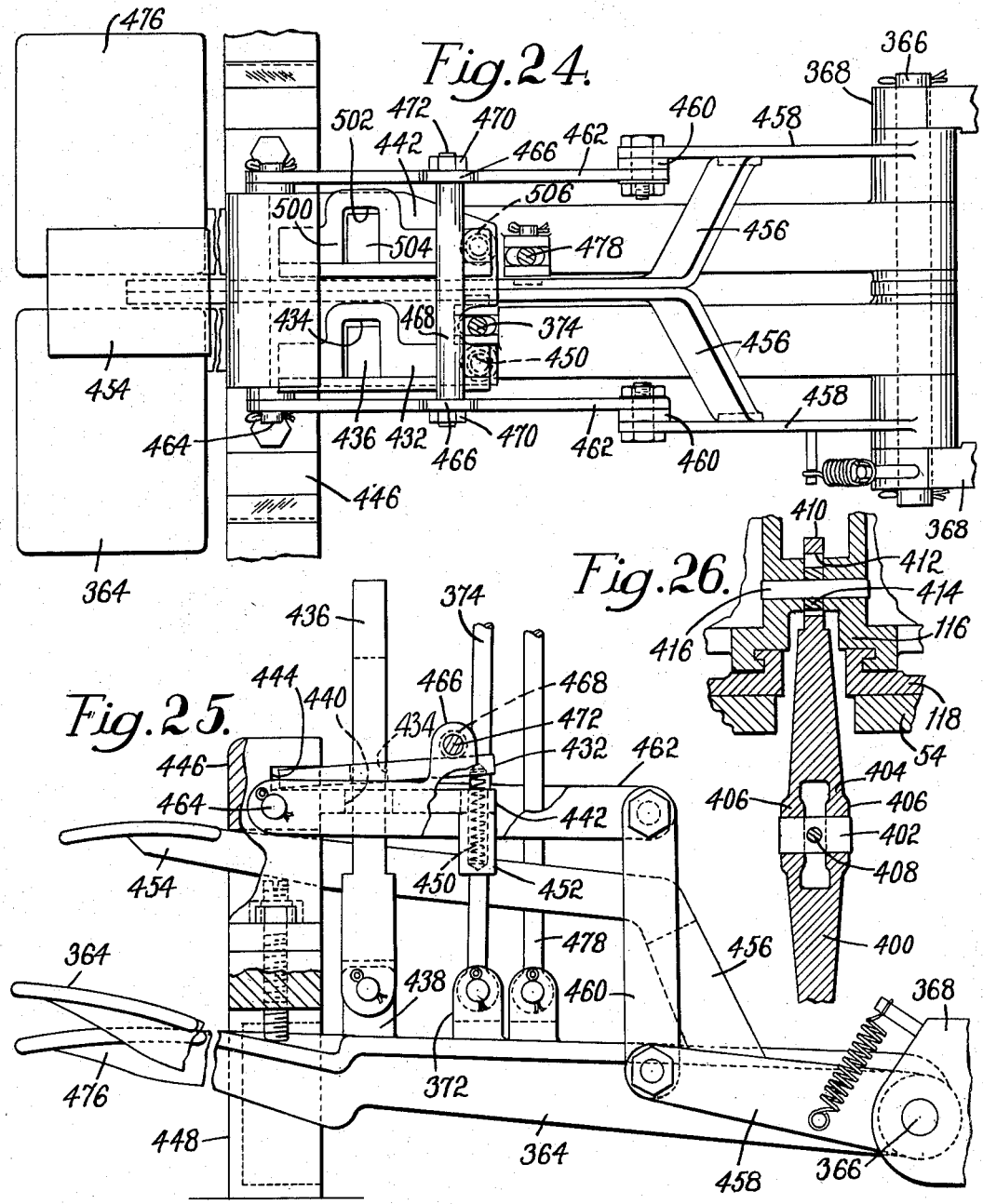

United States Patent Office 2,733,459
Patented Feb. 7, 1956

2,733,459

LASTING MACHINES

René E. Duplessis, Beverly, Mass., assignor to United Shoe Machinery Corporation, Flemington, N. J., a corporation of New Jersey Application January 15, 1952, Serial No. 266,545

51 Claims. (Cl. 12—7.3)

This invention relates to machines for shaping uppers over lasts and is herein illustrated in its application to prewelt lasting machines of the type illustrated, for example, in United States Letters Patent No. 2,042,518, granted June 2, 1936, on an application filed in the name of Karl Engel. Machines of this type are provided with lasting wipers constructed and arranged to enter the welt crease of a prewelt upper and to wipe the welted margin inwardly over a last bottom and to support the welt in lasted position while a sole is laid thereon and initially secured thereto by cement, such initial attachment of the sole to the welt being the only means for holding the upper in lasted position.

In the manufacture of prewelt shoes the extent of overwiping movement of the welted margin inwardly over the last bottom is critical and the wipers accordingly must be accurately fitted. In order to achieve the best shoemaking results it has been found desirable heretofore to limit the use of any given set of lasting wipers to a short range of shoe sizes, usually one and one-half sizes in the case of the toe wipers, and consequently it has been necessary to change wipers frequently. While the organization of the wipers and the wiper carriers in machines of this type has been greatly improved to facilitate the changing of wipers, this is still a time consuming operation. Moreover, the provision and storage of a large complement of wipers for each lasting machine involves substantial expense to the shoe manufacturer.

It is an object of the present invention to reduce the cost of prewelt shoe manufacture by providing a machine of the type above described having lasting wipers constructed and arranged to operate on a large run of shoe sizes, thus reducing to a minimum the changing of wipers for operation on different sizes of shoes and greatly reducing the cost of the wipers and the expense of their storage. In those shoe factories where separate machines are provided for right and left shoes and where a given machine operates only on a limited run of sizes the use of prewelt lasting machines having the features of the present invention eliminates entirely the necessity for changing wipers in the operation of the machine on different sizes of shoes.

It is a further object of the invention to provide a machine which is adapted to operate on prewelt shoes of all sizes and styles including men's and women's shoes but is nevertheless relatively simple in construction and economical to manufacture and requires no power for its operation.

With these and other objects in view, as will hereinafter appear, the present invention, in one aspect thereof, consists in the provision in a lasting machine of toe lasting wipers, heel lasting wipers, slide lasting wipers, and two flexible wiping members, one at each side of a shoe in the machine, extending substantially the full length of the shoe, and constructed and arranged to overwipe those portions of the lasting margin not overwiped by said wipers. The flexible wiping members are constructed and arranged to conform to the peripheral contour of a shoe in the machine upon contact therewith. In accordance with a further feature of the invention the flexible wiping members are readily adjustable to cause them to conform to the profile of the shoe bottom. The side lasting wipers above referred to operate respectively at opposite sides of the shank portion of the shoe and a suitable carrier is provided at each side of the shoe for mounting both the shank wiper and the flexible wiping members. For mounting the toe wipers means herein illustrated as a carrier is provided and said carrier is constructed and arranged to mount the toe end portions of the flexible wiping members. A similar carrier is provided at the heel end of the machine for mounting the heel wipers and the heel end portions of the flexible wiping members.

The illustrated flexible wiping members each comprises a forepart lasting section, a rear part lasting section, and an intermediate section which separates the other two sections substantially to the extent of the width of the shank wiper plate. A suitable fastening means is provided for removably attaching both the shank wiper plate and the flexible wiping member to the shank wiper carrier. The flexible wiping member consists of a plurality of imbricate wiper members or scales mounted in a flexible member which, in the illustrated organization, extends generally lengthwise of a shoe in the machine. The illustrated flexible member is channel shaped and the wiper plates are set into the flexible member and held in predetermined relation to each other by a suitable retainer fixed in the channel. The opposite end portions of the channel members are mounted in suitable ways in the toe wiper carriers and the heel wiper carriers, respectively, the carriers and the channel members being freely slidable relatively to each other to permit movement of the carriers toward and from each other lengthwise of the shoe. The illustrated channel member is characterized by portions extending respectively toewardly and heelwardly from its central section and having a series of steps for mounting a series of side wiper plates. Preferably the steps incline longitudinally of the channel member and downwardly away from its central section. In the illustrated construction the steps are arranged in contiguous relation to each other and serve to mount a plurality of side wiper plates in successively overlapping relation. Each of the wiper plates comprises an upper engaging portion and a shank portion and the shank portion is embedded in the resilient member which in the illustrated organization is made of vulcanized rubber. The shank portion of each wiper plate is fitted to the channel of the resilient member and the retainer which fits into the channel is provided with grooves constructed and arranged to receive the angular shank portions of the wiper plates and to locate and secure said plates in predetermined relation to each other longitudinally of said channel.

In accordance with another feature of the invention the illustrated flexible wiper member has removably mounted thereon a member constructed and arranged to engage a portion of the upper adjacent to its welted margin thereby to limit the overwiping movement of the lasting elements mounted on the flexible member thus to determine accurately the extent of overwiping movement of the welted margin.

In its relation to work supporting means the invention provides a work supporting member constructed and arranged for movement heightwise of a shoe in the machine, a member on which both the wipers and the the work support are mounted, means mounting the member for angular movement on an axis extending heightwise of a shoe in the machine, and an actuator which operates both to close certain end lasting wipers and to move the work support heightwise of the shoe into supporting position. In its relation to the wiper actuating mechanism the invention provides an actuating member movable generally lengthwise of the shoe in a fixed path and having an abutment surface constructed and arranged to engage an abutment member projecting from a wiper head, the actuating member being adapted to operate on the wiper head an any adjustive position of said head.

These and other features of the invention will now be described with reference to the accompanying drawings and pointed out in the appended claims.

In the drawings,

Fig. 4 is a left side elevation of the upper part of the machine with the frame omitted and certain parts shown in section on the line IV—IV of Fig. 2;

Fig. 5 is a section taken on the line V—V of Fig. 2;

Fig. 7 is an enlarged section taken on the line VII—VII of Fig. 6;

Fig. 8 is a perspective view on an enlarged scale illustrating the side wiper carrier with a portion only of the total complement of wiper plates mounted therein and a portion of a retaining member for the wiper plates shown in section;

Fig. 9 is a perspective view of a portion of the retaining member;

Fig. 10 is a greatly enlarged perspective view illustrating one of the wiper plates;

Fig. 11 is an enlarged sectional view taken substantially on the line IV—IV of Fig. 6;

Fig. 12 is a plan view of the shank lasting wiper illustrated in Fig. 11;

Fig. 13 is a plan view illustrating the clamping plate shown in Fig. 11;

Fig. 14 is a perspective view of the wiper supporting plate shown in Fig. 11;

Fig. 15 is a perspective view greatly enlarged illustrating a member for mounting one of the side wiper assemblies;

Fig. 16 is a perspective view illustrating the carrier for the toe wiper assembly and certain mechanisms associated therewith;

Fig. 17 is a perspective view of a carrier for one of the shank wiper and side wiper assemblies;

Fig. 18 is an enlarged front elevation, partly in section, illustrating parts of the toe head assembly;

Fig. 19 is an enlarged plan view illustrating the toe wiper carrier and mechanism associated therewith;

Fig. 20 is a plan view similar to Fig. 6 illustrating certain parts not shown in Fig. 6;

Fig. 21 is a section on the line XXI—XXI of Fig. 20;

Fig. 22 is a plan view illustrating certain mechanism in the toe head of the machine;

Fig. 23 is a section on the line XXIII—XXIII of Fig. 22;

Fig. 24 is a plan view on an enlarged scale illustrating the treadle assembly;

Fig. 25 is a right side elevation of the treadle assembly on the same scale as Fig. 24; and Fig. 26 is a section on the line XXVI—XXVI of Fig. 3.

Figure 1:
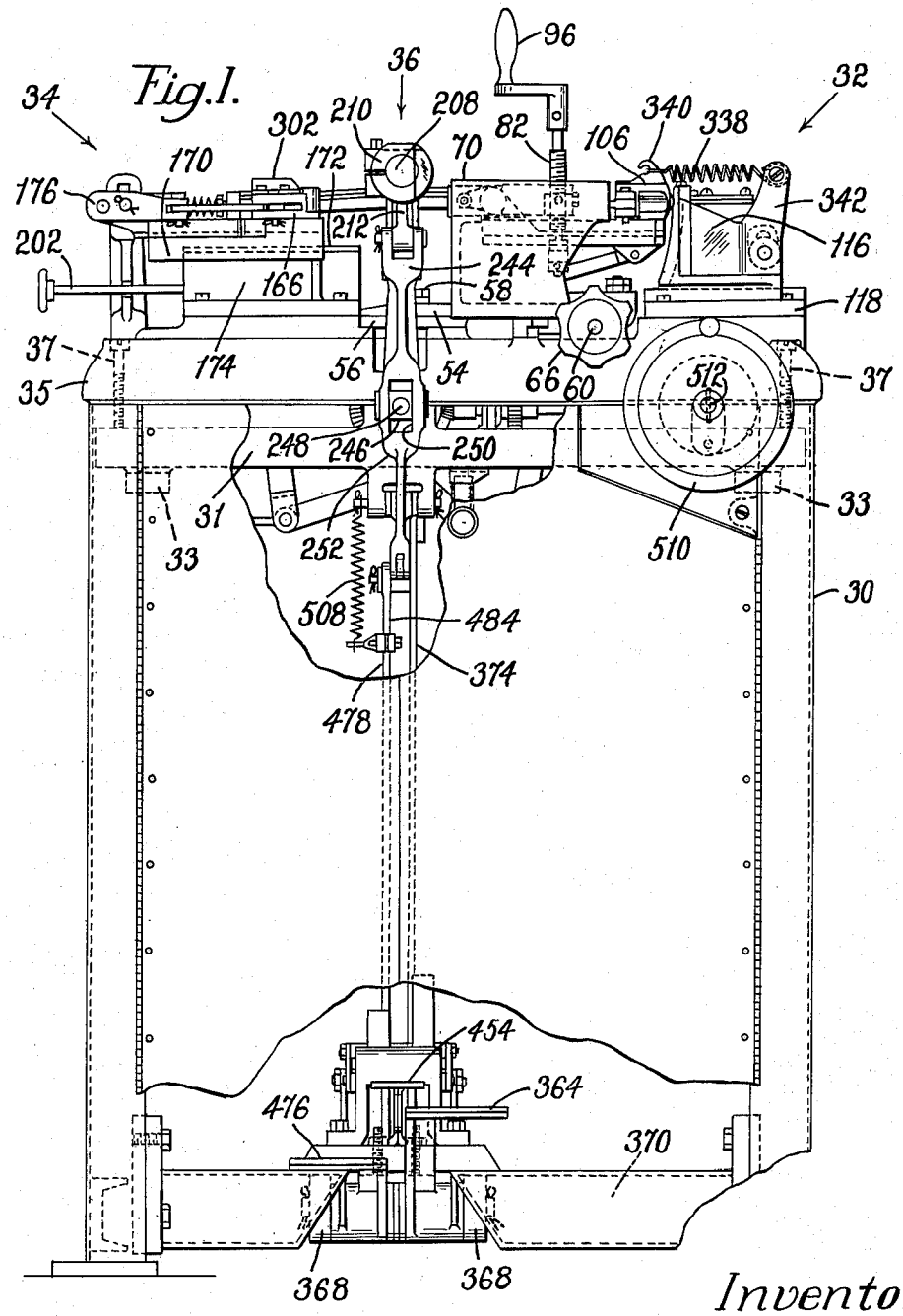
Fig. 1 is a front elevation of a machine embodying the features of the present invention, a portion of the frame being broken away to disclose certain operating mechanisms.

Referring to Fig. 1 the invention is illustrated as embodied in a machine having a frame comprising a base 30, a crosshead 31 fixed to lugs 33 extending inwardly from the base, and a top plate 35 secured to the base by screws 37. The top plate provides a mounting for a toe head identified generally by the numeral 32, a heel head identified generally by the numeral 34, and two shank wiper assemblies at opposite sides of a shoe in the machine, one of which is identified generally in Fig. 1 by the numeral 36.

Figure 2:
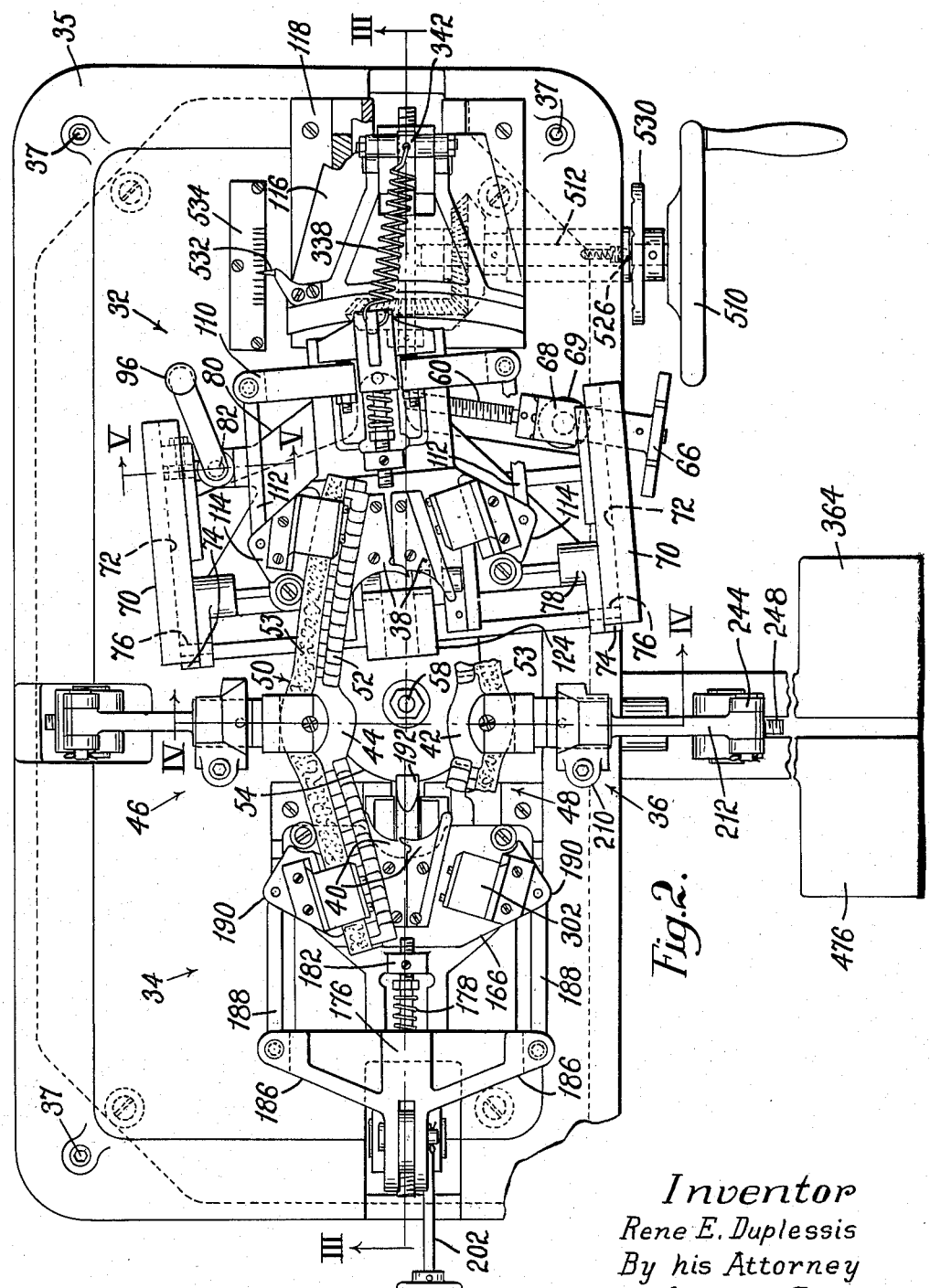
Fig. 2 is a plan view of the machine illustrated in Fig. 1 with portions of the side wiper mechanism broken away to disclose wiper carrying mechanism.

Referring to Fig. 2 a pair of toe wipers 38 are mounted in the toe head and constructed and arranged for bodily movement lengthwise of a shoe in the machine and for closing movement on a common axis adjacent to the center of the toe end of the shoe. Mounted in the heel head is a pair of heel wipers 40 constructed and arranged to move bodily lengthwise of a shoe in the machine concomitantly with the toe wipers and to close on a common axis adjacent to the back seam of the shoe. Mounted in the shank wiper assembly 36, is a shank wiper plate 42 and a similar shank wiper plate 44 is mounted in a shank wiper assembly 46 at the rear of the machine. Also mounted in the shank wiper carriers are two side wipers 48 and 50 each of which comprises a resilient member 53 in which there is mounted a plurality of short wiper members herein illustrated as imbricate scales one of which is identified by the numeral 52 in Fig. 2. The scales are mounted in overlapping relation in the resilient member 53 and are constructed and arranged to operate in the welt crease of a prewelt upper.

Figure 3:
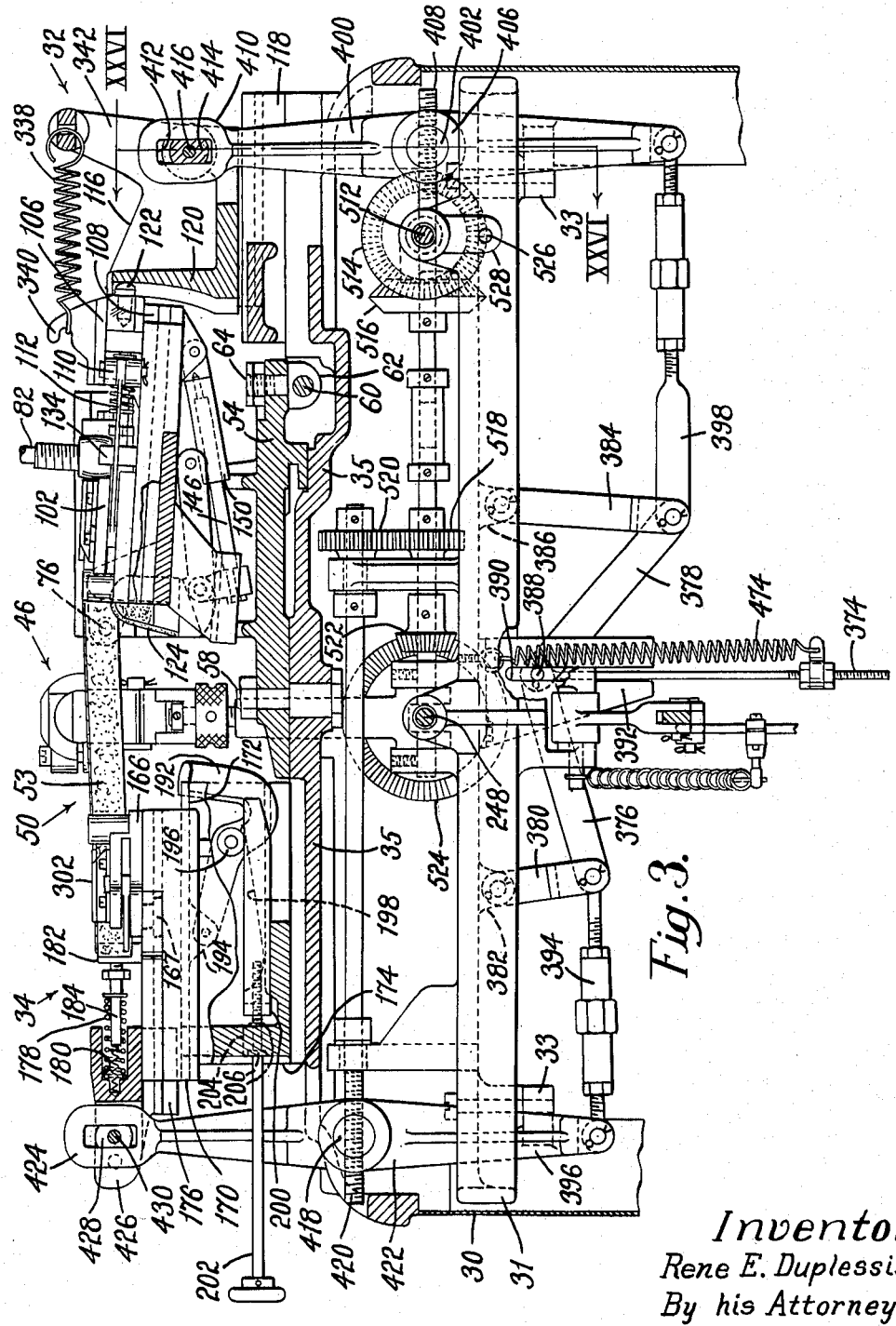
Fig. 3 is a front elevation of the upper part of the machine with the front of the machine frame broken away and certain parts shown in section on the line III—III of Fig. 2.
Figure 6:
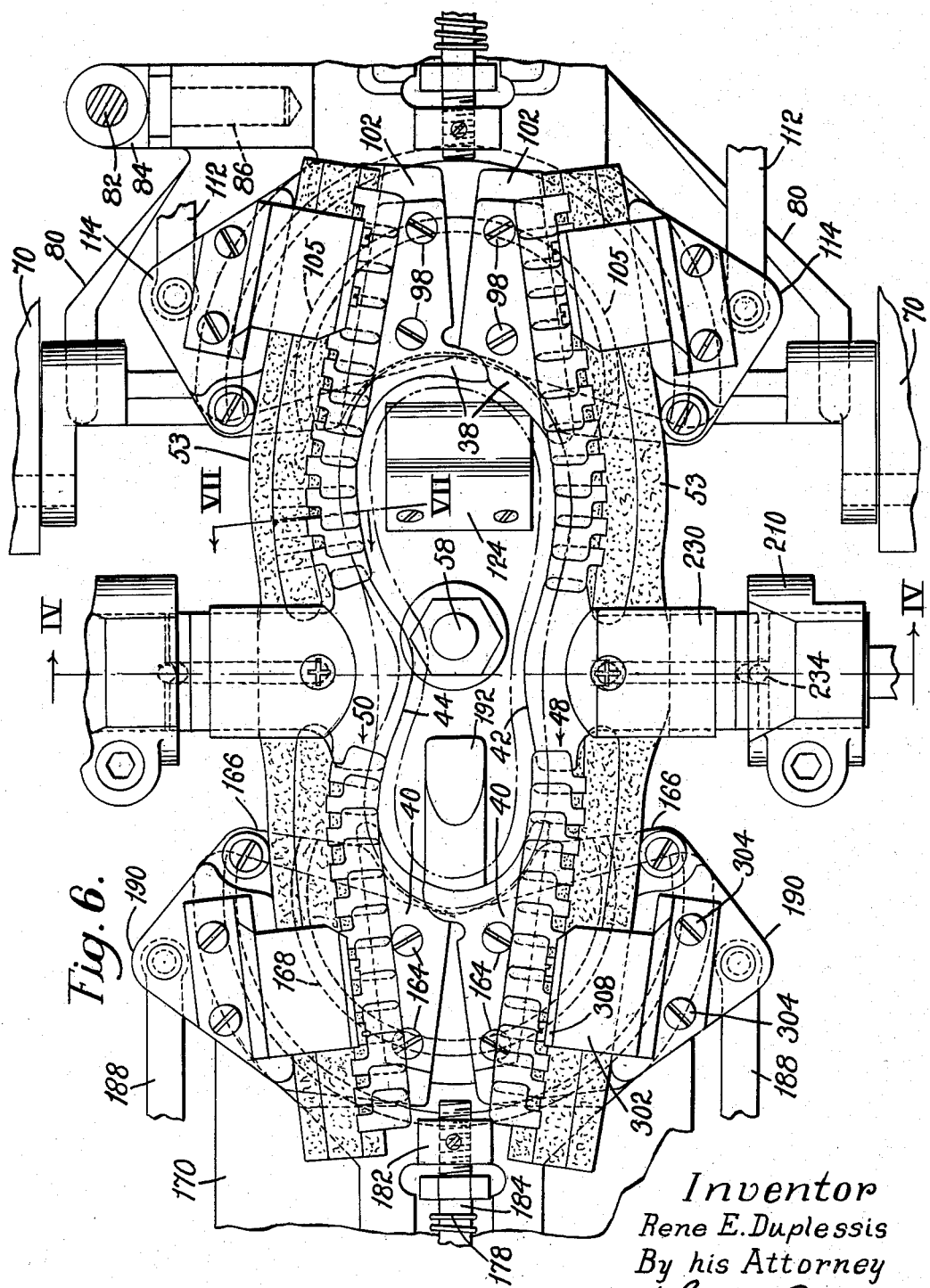
Fig. 6 is a plan view illustrating the wiper mechanism on a larger scale than Fig. 2.

Referring to Figs. 2 and 3, the illustrated toe head is mounted on a base plate 54 supported by a raised portion 56 of the top plate 35. To provide for the adjustment of the toe wipers to the swing of the last the base plate is fulcrumed on a stud 58 projecting upwardly from the top plate 35 and a hand screw 60 is provided for effecting angular movement of the base plate. The hand screw is threaded through a tapped hole in a head 62 at the lower end of a pin 64 swiveled in an extension of the base plate 54. The head 66 of the hand screw is journaled in a member 68 having a cylindrical base portion 69 swiveled in the machine frame. The axis of the stud 58 coincides substantially with the intersection of the longitudinal median lines of the forepart and the rear part of a shoe in the machine. Projecting upwardly with an outward inclination from opposite sides of the base plate 54 are parallel wals 70 (Fig. 4) the inner surfaces of which have horizontal grooves 72 formed therein. Mounted in the grooves are slides 74 which mount a wiper carriage 80 (Fig. 16) having ears 78 extending upwardly from its lateral extremities, said ears being bored to receive pivot pins 76 fixed in the slides. To provide for angular adjustment or tilting of the toe wipers on an axis extending widthwise of a shoe in the machine, an adjusting screw 82 (Fig. 5) is provided for swinging the wiper assembly on the common axis of the pins 76. The reduced lower end portion of the hand screw is journaled in a bore in an offset head 84 of a pin 86 swiveled in a cylindrical extension 87 of the carriage 80, and is held against endwise movement by collars 88 and 90 secured to said reduced lower end portion. The screw 82 extends through a tapped hole in a block 92 swiveled in the slide 74 at the rear of the carriage 80. The screw 82 has a hand crank 96 fixed to its upper end portion. Referring to Fig. 6, the illustrated toe wipers 38 are secured by headed screws 98 to two lands 100 (Fig. 19) formed in wiper carriers 102. Each of the carriers has depending therefrom an arcuate T-shaped tongue 104 which is slidably mounted in a complementally shaped groove 105 (Fig. 16) formed in the plate 80. As shown in Fig. 19, the rear end portions of the tongues 104 are cut away from their center lines inwardly and outwardly respectively and are extended for mutual engagement of their contiguous inner edge faces. For imparting closing and opening movements to the toe wiper plates a slide 106 (Fig. 18) is mounted between rearwardly extending parallel arms 108 (Fig. 16) formed in the plate 80 and has a tongue and groove mounting in the inner walls of the arms. Pivotally mounted on the slide 106 for angular movement in a horizontal plane is a crossbar 110 (Figs. 2, 22 and 23) the opposite ends of which are connected by links 112 to ears 114 projecting outwardly from the wiper carriers 102 respectively. For imparting closing movement to the wipers an actuator herein illustrated as a slide 116 (Fig. 3) has a tongue and groove mounting on a fixed horizontal plate 118 for movement lengthwise of a shoe in the machine. The slide 116 has an upwardly extending portion 120 constructed and arranged to engage the head of a pin 122 mounted in the slide 106. To accommodate the tilting adjustment of the toe head the pin engaging surface of the slide 116 is formed on an arc struck from the axis 76, and to accommodate the adjustment of the toe head for the swing of the last the pin engaging surface of the slide 116, as seen in Fig. 2, has the formation of an arc struck from the axis 58. In the operation of the toe wipers the slide 116 is manually moved to the left, as seen in Fig. 3, by mechanism hereinafter described. The movement of the slide is transmitted to the toe wipers through the slide 106, the crossbar 110, and the links 112. Referring to Fig. 23, the crossbar 110 is pivotally connected to the slide 106 by a pin 312 extending downwardly from the central portion of the crossbar into a bore in the slide. The central portion is of reduced thickness and is downwardly offset relatively to the side portions of the crossbar and positioned in a horizontal recess formed in the slide. The initial advancement of the slide 106 is transmitted to the wipers through a relatively light spring 314 (Fig. 22). When the toe wipers meet the resistance of the work at the toe end of the shoe the spring 314 compresses while the slide 106 advances the crossbar to cause the wipers to close on the opposite sides of the toe portion of the upper. After the wipers enter the welt crease at opposite sides of the toe portion further advancement of the slide 106 energizes a relatively heavy spring 316 to apply overwiping pressure to the wipers. As shown in Fig. 22, the light spring 314 is mounted in a bore 318 formed in the upper portion of the slide 106 and the heavy spring 316 is mounted in a counterbore 320 and surrounds a stem 322 having a threaded end portion adjustably mounted in a tapped hole in a lug 134 (Fig. 16) projecting upwardly from the plate 80. The light spring 314 is confined between the end of the stem 322 and the end of the pin 122. The heavy spring 316 is seated in the base of the counterbore 320 and its opposite end is arranged in predetermined space relation to a head 324 on the stem 322. The space between the spring 316 and the head 324 is adjustable by turning the stem in the lug 134, and the stem is secured in adjusted position by a set screw 325 (Fig. 18). The crossbar 110 is normally held in right angular relation to the slide 106 by two springs 326 mounted in sockets 328 formed in the opposite side portions 330 of the slide 106 and arranged to surround pins 332 projecting from the crossbar into the socket. The springs bear against heads 334 formed in the pins 332 respectively and the pins are threaded for endwise adjustment in the crossbar 110 and are secured in adjusted position by lock nuts 336. The springs 326 normally hold the crossbar in its right angular position shown in Fig. 22 but yield readily to permit such limited swinging movement of the crossbar as may be required to permit the toe wipers to adjust themselves to the work. In order to retract the toe wipers after the completion of the operation on the shoe the slide 106 is moved to the right, as seen in Fig. 3, by a spring 338 one end of which is anchored to a hook 340 projecting upwardly from the slide 106 and the other end of which is anchored to an upward extension 342 of the slide 116.

During the operation of the toe wipers the toe portion of the shoe is supported by a toe rest 124 (Fig. 18). The toe rest projects upwardly from the free end portion of an arm 126 pivotally mounted at 127 between ears 128 projecting downwardly from the plate 80. The free end portion of the arm 126 is supported by rolls 136 (Fig. 16) which engage undercut surfaces 138 formed in the arm and having an inclination downwardly to the left, as seen in Fig. 18. Each of the rolls in mounted on a cross pin 140 (Fig. 16) fixed in an ear 142 projecting upwardly from a head 144 at the left end of a cylindrical slide 146 (Fig. 18) mounted in a bore 148 formed in an arm 150 pivotally mounted between ears 152 projecting downwardly from the slide 106. For supporting the head 144 the outwardly extending portion of each pin 140 has pivotally mounted thereon a roll 154 (Fig. 16) constructed and arranged to engage a flange 156 projecting inwardly from a downward extension 158 of the plate 80. As shown in Fig. 18, the flange 156 lies in a horizontal plane and consequently movement of the head 144 to the left, as seen in Fig. 18, causes the rolls 136 to impart upward movement to the toe rest. Such movement is imparted to the head 144 by the action of the arm 150 on a spring 160 mounted in the bore 148 and in a bore 162 formed in the slide 146. To provide for the retraction of the slide 146 a headed pin 163 is axially mounted in the cylindrical slide 146 and arranged to extend axially through the bores 162 and 148 and is threaded into a tapped hole in the right end portion of the arm 150.

The heel wipers 40 are secured by headed screws 164 (Fig. 6) to wiper carriers 166 which are generally similar to the toe wiper carriers 102. Depending from the carriers are arcuate tongues (not shown) which slide in an arcuate groove 168 in a slide 170. The slide 170 is mounted for horizontal movement lengthwise of a shoe in the machine on tongues 172 (Fig. 3) extending laterally outwardly from the upper extremities of two standards 174 fixed to the top plate 35. For actuating the heel wipers a slide 176 is mounted in suitable ways formed in two parallel extensions of the slide 170 and is arranged to act against a spring 178 mounted in a socket 180 in the slide and arranged to bear against a lug 182 projecting upwardly from the slide 170 and having fixed therein a pin 184 which serves to locate the right end portion of the spring. Referring to Fig. 2, the slide 176 has outwardly extending arms 186 the extremities of which are connected by links 188 to ears 190 projecting outwardly from the wiper carriers 166. For mounting the heel end portion of a shoe in the machine a supporting member 192 (Fig. 3) is constructed and arranged to engage the flat cone face of a last mounted in the shoe. The illustrated supporting member is in the form of a bent arm pivotally mounted between ears 194 projecting downwardly from the slide 170. The arm 192 is supported against downward movement by the engagement of rolls 196 carried by said arm with inclined surfaces 198 formed in a slide or cam 200 mounted in the common base of the standards 174. To provide for the adjustment of the work supporting arm 192 for supporting lasts having different heel heights the slide 200 is adjustable longitudinally by turning a hand screw 202 which has threaded engagement in a tapped hole in the slide 200 and is mounted in a bore in an end wall extending between the standards 174, the hand screw being held against endwise movement by collars 206 fixed thereto and arranged to engage opposite sides of the wall 204. In the operation of the machine the work supporting arm 192 advances with the slide 170 while the slide 200 remains stationary thus causing the rolls 196 to ride up the inclined surfaces 198 thereby forcing the heel portion of the last upwardly against the inwardly extending portion of the welted margin of the upper.

The shank wipers 42, 44 and the side wiper members 48, 50 are mounted in carriers for operating movement toward each other widthwise of a shoe in the machine and for angular adjustive movement on a horizontal axis extending widthwise of the shoe. Referring to Figs. 11 and 17, illustrating the wiper carrier located at the right side of the shoe and in the front of the machine, said carrier comprises a cylindrical member or hub 208 mounted for limited rotary movement in a split clamp 210 (Fig. 15) formed in and projecting upwardly from an arm 212. Extending to the left from the hub 208 is a section 214 the top of which is a plane surface which lies below the axis of the hub 208 to the extent of the combined thicknesses of the shank wiper plate 42 and the wiper supporting plate 209. The opposite side and bottom portions of the extension 214 are a continuation of the cylindrical surface of the hub 208. Extending to the left, as seen in Fig. 11, from the extension 214 of the hub 208 is a section 216 which has a cylindrical bottom surface mounted for sliding movement in a dished-out recess 218 (Fig. 15) formed in the rear end portion of the arm 212, said cylindrical base portion being downwardly offset with relation to the cylindrical bottom surface of the extension 214. Extending upwardly from the rear end portion 216 of the carrier is a cylindrical portion 220 in which is mounted a headed clamping screw 222. The screw extends through an open ended slot 224 (Fig. 12) formed in the shank wiper plate and a similar open ended slot 225 (Fig. 14) formed in the wiper supporting plate 209, and the head of the screw is seated in a countersunk bore 228 (Fig. 13) formed in a top plate 230 which bears against the upper surface of the shank wiper plate 42, as shown in Fig. 11. The screw 222 clamps the wiper plate 42 between the top plate 230 and the supporting plate 209 and secures the assembly against the annular upper end surface of the extension 220 and the forward end portions of the three plates are seated in a recess or notch 232 (Fig. 17) formed in the rear portion of the hub 208. For orienting the wiper plate 42 so as to cause it to register accurately with the welted margin of a shoe in the machine a pin 234 (Fig. 17) is mounted in the hub 208 at right angles to the wiper plate 42 and extends into the notch 232 in the hub 208 to the extent of the greater part of its diameter for engagement in the end portion of the open ended slot 224 formed in the wiper and the open ended slot 225 formed in the plate 209 and in a notch 236 formed in the forward end portion of the top plate 230. The enlarged central portion of the side wiper member 53 is bored to permit it to be removably mounted on the upward extension 220 of the shank wiper carrier. The vertical dimension of the central portion of the side wiper member 53 corresponds substantially to the height of the upward extension 220 of the shank wiper carrier so that the member 53 is confined between the plane top surface of the rear end section 216 of the shank wiper carrier and the plane bottom surface of the plate 209. The wiper member 53 is not clamped between the plate 209 and the rear end portion 216 of the shank wiper carrier but is left free for angular movement on the cylindrical extension 220 for self-adjustment during the lasting operation. When it is desired to remove the shank wiper plate 42 from the wiper carrier as, for example, in changing the shank wipers for operation on a different run of sizes the clamping screw 222 need not be removed from the extension 220 but is merely slacked off sufficiently to relieve the pressure of the top plate 230 on the wiper plate so that the wiper plate is free to slide rearwardly between the top plate and the supporting plate 209. Referring to Fig. 4, the arm 212 is mounted on a parallel motion mechanism comprising an arm 240 pivotally mounted at its lower end portion between ears 241 projecting upwardly from the crosshead 31 and a lever 244 pivotally mounted on a trunnion block 246 threaded onto the forward end portion of a shaft 248. Referring to Fig. 1, the trunnion block 246 is freely mounted between the side walls of a rectangular opening 250 in the enlarged central portion 252 of the lever 244. At its upper end the lever 244 is pivotally connected to the forward end portion of the arm 212. Referring to Fig. 4, the arm 240 has mounted in its upper end portion a capstan head screw 254. A pin 256 projects upwardly from the head of the screw to provide a swivel mounting for a yoke 258 in which is pivotally mounted that portion of the arm 212 beneath the section 214 (Fig. 11) of the shank wiper carrier. A collar 260 fixed to the end portion of the pin holds the yoke against upward movement relatively to the pin. The capstan head of the screw 254 provides a convenient means for adjusting the shank wiper assembly and the adjacent portions of the side wiper assembly heightwise of a shoe in the machine without disconnecting the yoke 258. The screw 254 may conveniently be secured in adjusted position by a split clamp 262 in the upper end portion of the arm 240.

Referring to Figs. 8, 9 and 10, the illustrated side wiper assembly comprises two sets of imbricate wiper plates or scales one of said scales being illustrated in Fig. 10 and identified in Fig. 8 by the numeral 52. The wiper scale 52 comprises a substantially flat work engaging portion 264 having a slightly convex wiping edge 266 constructed and arranged to operate in the welt crease of a prewelt upper. For mounting the wiper 52 in the member 53 the wiper has a shank portion 268 in the form of a bent angle plate extending downwardly from the wiper plate at a right angle thereto. The wiper plate has a section 270 offset to the right from the shank portion 268 and tapered to a well-defined edge 272 and arranged in overlying relation to the next adjacent wiper plate to the right of the wiper 52. In the set of wiper plates in the right portion of the member 53 the structure of the wiper plates differs from the structure illustrated in Fig. 10 only in that the offset portion of the work engaging section extends to the left from the shank portion of the wiper. Opposite the edge 272 the wiper plate 52 has an edge face 274 the thickness of which corresponds to the depth of any one of a plurality of uniform saw tooth notches formed in the wall 278 of the member 53. In its assembled position in the member 53 the wiper plate is so arranged that its edge face 274 lies in contiguous relation to the vertical wall of the notch 276 and the work engaging portion 264 of the wiper plate projects beyond the outer face of the wall 278 while the shank portion 268 of the wiper plate is arranged in contiguous relation to the inner surface of the wall 278 and the base 280 of a channel defined by the wall 278 and a parallel wall 282. For securing the wiper plates in their respective assembled positions in the member 53 a filler piece or plug 284 (Fig. 9) is constructed and arranged to fit into the channel 286 in the right portion of the member 53 and a similar plug 288 is constructed and arranged to fit into the channel in the left portion of said member. For locking the shank portion of each wiper plate in predetermined position in the member 53 each plug has suitable notches formed therein and arranged to receive the angular shank portion of the wiper plate. The structure of the notches is illustrated in Fig. 9 in which the numeral 290 indicates a vertical notch and the numeral 292 identifies a horizontal notch formed in the base portion of the plug and communicating with the vertical notch. Preferably each plug is constructed of the same material as the member 53, said member in the illustrated organization being of resilient vulcanized rubber. Preferably the plugs are secured in their respective assembled positions in the channels in the member 53 by suitable adhesive. Referring to Figs. 8 and 12, the wiper plate 294 at the inner end of the left section of the wiper assembly overlies an extension 296 of the shank wiper plate 42 and the corresponding end wiper plate (not shown) in the right section of the wiper assembly overlies an extension 298 of the shank wiper plate. It will be understood that the illustrated side wiper assembly is sufficiently flexible to permit the required adjustment of the shank wiper plate 42 to the angular disposition of the shank portion of a shoe in the machine and also permits the side wiper assembly to adjust itself readily to the peripheral contour of the bottom of a shoe in the machine, as shown in Fig. 6.

Preferably, the side wiper assemblies are made long enough for operation on the largest size shoe on which the illustrated machine is intended to operate and the assemblies are so mounted relatively to the toe head and the heel head that they are adjusted automatically for operation on smaller shoes by the adjustment of the toe head and the heel head toward each other. To that end, the end portions of the wiper assemblies at the toe end of the shoe are mounted in converging channels 300 (Fig. 19) formed in the toe wiper carriers 102 and the end portions of the side wiper assemblies at the heel end of the shoe are mounted in similar channels formed in the heel wiper carriers. The end portions of the side wiper assemblies are freely mounted in their channels to permit relative movement of the toe or heel heads and the side wiper assemblies during the movement of said heads toward or from each other in the operation of the machine or in the adjustment of the wipers for operation on shoes of different sizes. Associated with each of the channels is a retainer or holddown member illustrated in Fig. 21 and comprising a plate 302 secured by screws 304 (Fig. 20) to the wiper carrier. To facilitate the relative movement of the end portion of the side wiper member and the holddown plate 302 the plate has freely mounted therein a plurality of rolls 306 mounted in suitable cylindrical grooves extending widthwise of the base portion of the plate. A retainer plate 308 secured by screws 310 to the edge face of the holddown plate 302 holds the rolls 306 against endwise movement out of the grooves in the holddown plate. The rolls 306 project downwardly slightly from the base of the holddown plate for engagement with the upper surface of the wiper member 53.

In lasting the shank portion of a prewelt shoe there is, in most cases, more resistance offered by the welted margin to the overwiping movement of the shank wiper 44 (Fig. 6) operating at the inside portion of the shank than is offered by the welted margin at the outside of the shank to the operation of the shank wiper 42. Inasmuch as the shoe is not jacked in the machine to hold it against widthwise movement the shoe tends to move toward the outside shank wiper in response to the advancement of the wiper 44 at the inside of the shank. In order to resist such bodily movement of the shoe a stop or spacer member 344 (Fig. 20) is applied to the wiper member 53 at the outside portion of the shank. This may be either the forward wiper member or the rear wiper member, depending upon whether the shoe to be operated upon is a right foot shoe or a left foot shoe. Accordingly, the spacer member 344 is constructed and arranged for convenient transfer from one wiper member to the other. In the illustrated construction the spacer member is a piece of resilient rubber flat on one side and convex on the other side having two headed pins 346 mounted therein and extending through the flat side of the spacer member for engagement in two sockets 348 formed in each of the wiper members 53. The pins fit in the sockets tight enough to hold the spacer member in its position relatively to the wiper member 53 shown in Fig. 20 while permitting the spacer member to be readily transferred from one wiper member to the other. It frequently happens that the pressures exerted by the wipers at opposite sides of the forepart of the shoe do not exactly balance and, consequently, it has been found desirable to locate the forepart of the shoe widthwise thereof in accurately predetermined relation to the wipers. To this end a spacer member 350 similar to the spacer member 344 is mounted on the wiper member 53 for engagement with the outside of the forepart of a shoe in the machine and a spacer member 352 is mounted in the opposite wiper member 53 for engagement with the inside of the forepart of the shoe. The spacer members 350 and 352 are attached to the wiper members 53 by headed pins 354.

For advancing the side wiper assemblies to overwipe the opposite sides of the forepart of a shoe in the machine each toe wiper carrier 102 has pivotally mounted thereon a roll 358 constructed and arranged to engage the outer face of the wiper member 53. In order that the force imparted to the side wipers by the roll 358 will be applied uniformly from the toe portion to the shank portion of the shoe without excessive local pressure at the point where the rolls engage the outer faces of the wiper members 53, a resiliently flexible member or wire 356 is mounted in a longitudinal groove in each wiper member 53 and is removably secured in said member by forming the wire with its end portions bent inwardly into right angular relation to the body of the wire for insertion into suitable sockets formed in the wiper member. The wire 356 is sufficiently stiff to resist a tendency of the rolls 356 to cause local flexure of the side wiper assemblies at the point where the rolls come in contact therewith. In order to cause each wire 356 to be secured against possible displacement from the groove in the wiper member 53, each wire has an outwardly offset portion 360 constructed and arranged to engage the vertical surface 362 at the inner portion of the central section 214 of the shank wiper carrier.

For simultaneously actuating the toe wipers and the heel wipers the illustrated machine is provided with a treadle 364 (Figs. 1, 24 and 25) pivotally mounted at its rear end on a short shaft 366 mounted in the forward end portions of two parallel arms 368 projecting forwardly from a crossbar 370 (Fig. 1) fixed to the machine frame. Projecting upwardly from the central portion of the treadle 364 is a yoke 372 in which is pivotally mounted the lower end portion of a link 374. At its upper end the link 374 is pivotally connected to the adjacent ends of two toggle links 376 and 378 (Fig. 3). The left end of the toggle link 376 is pivotally mounted in the lower end portion of an arm 380 pivotally mounted at its upper end between ears 382 projecting downwardly from the crosshead 31. Similarly the right end of the toggle link 378 is pivotally connected to the lower end portion of an arm 384 the upper end of which is pivotally mounted between ears 386 projecting downwardly from the crosshead 31. For reasons which will hereinafter become apparent the arm 380 is made substantially shorter than the corresponding arm 384. The pivot pin 388 connecting the toggle links 376 and 378 is held against horizontal movement by extending it forwardly into a vertical open-ended slot 390 formed in a bracket 392 fixed to the crosshead 31. Pivotally mounted on the lower end of the arm 380 is an extensible link 394 which connects the arm to the lower end portion of a lever 396 which advances the heel wiper slide 176. Similarly the arm 384 is connected by an extensible link 398 to the lower end portion of a vertical lever 400 similar to the lever 396, said lever 400 being constructed and arranged to advance the slide 116 which actuates the toe wipers. Referring to Fig. 26, the lever 400 is pivotally mounted on a cross pin 402 which extends through the hollow central section 404 of the lever and is journaled in two hubs 406 projecting outwardly from said central section. The central portion of the cross pin 402 is diametrically bored and tapped to receive a horizontal screw which provides a mounting for the cross pin and a means for operating the lever 400 to adjust the toe wipers for operation on shoes of different sizes. The screw 408 extends through the hollow portion 404 of the lever 400 and holds the lever 400 against widthwise movement on the cross pin 402. At its upper end the lever 400 is provided with a head 410 in which is formed a vertical slot 412 (Fig. 3). The upper portion of the lever 400 extends through an open-ended slot in the plate 118 and the head 410 is positioned in the bifurcated end portion of the slide 116. To provide a pivotal connection between the head 410 and the slide 116 a member 414 is slidably mounted in the slot 412 and pivoted on a cross pin 416 mounted in the slide 116. The lever 396 at the heel end of the machine is mounted on a cross pin 418 similar to the cross pin 402 which mounts the lever 400 and the cross pin is mounted on a screw 420 corresponding to the screw 408. The screw 420 extends through a hollow central section 422 of the lever 396 and is operable by mechanism hereinafter described to actuate the lever 396 in order to adjust the heel wiper assembly toward and from the toe wiper assembly for operation on shoes of different sizes. The head 424 at the upper end portion of the lever 396 is mounted in the bifurcated left end portion 426 of the heel wiper operating slide 176 and the head 424 is vertically slotted in the same manner as the head of the lever 400 to receive a member 428 pivotally mounted on a cross pin 430 carried by the bifurcated end portion of the slide 176.

In order to provide support for the welt of a lasted prewelt shoe in the machine while a sole is laid thereon the toe wipers and heel wipers are held in their respective advanced positions by a clutch mechanism of the so called monkey grip type which operates to hold the treadle 364 against upward movement. Referring to Figs. 24 and 25, the illustrated clutch mechanism comprises a plate 432 having a rectangular opening 434 the forward wall of which is so constructed and arranged that its bottom edge exerts a clutching action on a vertical bar 436 pivotally mounted at its lower end in a yoke 438 projecting upwardly from the treadle 364 and extending upwardly from the yoke through a clearance opening 440 in a fixed shelf 442 and through the opening 434 in the plate 432. The forward portion of the clutch plate 432 is mounted in a groove 444 in a standard 446 extending upwardly from a crossbar 448 at the front of the base portion of the machine. The clutch plate 432 is normally held in its inclined position shown in Fig. 25 by a spring 450 seated in a socket formed in the shelf 442 and extending downwardly into a boss 452 on the bottom of the shelf, the upper end portion of the spring being seated in a socket in the bottom of the rear end portion of the plate 432. The spring 450 normally holds the plate 432 in clutching engagement with the bar 436 in order to hold the bar against upward movement while permitting free downward movement thereof. In order to permit upward movement of the treadle 436 to its rest position, shown in Fig. 25 the clutch plate 432 is released by the operation of a treadle 454. The lower portion of the treadle 454 comprises diverging arms 456 fixed to parallel arms 458 pivotally mounted on the shaft 366. The parallel arms 458 extend forwardly beyond the arms 456 and are connected by two links 460 to the rear end portions of the parallel horizontal arms 462 pivotally mounted on the cross pin 464 mounted in the standard 446. Projecting upwardly from the arms 462, respectively, substantially midway between their ends are two ears 466 between which a tube 468 is secured by clamping nuts 470 threaded onto the opposite end portions of a screw 472 extending through the tube 468 and through suitable openings in the ears 466. During the downward movement of the treadle 454 the tube 468 engages the upper surface of the clutch plate 432 and swings the plate downwardly to release the clutching engagement thereof with the bar 436 thus permitting a spring 474 (Fig. 3) to return the treadle 364 to its position shown in Fig. 25 and to act on the treadle operated mechanism hereinbefore described to retract the toe wipers and the heel wipers in order to permit the removal of the shoe from the machine.

For actuating the shank and side wiper assemblies the illustrated machine is provided with a treadle 476 (Fig. 1) pivotally mounted on the shaft 366 (Fig. 25) and connected by a link 478 to a crossbar 480 (Fig. 4) the opposite ends of which are connected by links 482 and 484 to the horizontal arms of bell crank levers 486 and 488 pivotally mounted on brackets 490 and 492, respectively, extending downwardly from the crosshead 31. The bell crank lever 486 is connected by a link 494 to the lever 244 and the vertical arm of the bell crank lever 488 is connected by a link 496 to a lever 498 corresponding to the lever 244 in the front of the machine. It will be understood that the lever 498 operates to advance the shank wiper carrier 46 in the rear of the machine concomitantly with the operation of the lever 244 to advance the shank wiper carrier 36 in the front of the machine. Referring to Figs. 24 and 25 the treadle 476 is locked against upward movement by a clutch mechanism which is substantially the same in its construction and operation as the clutch mechanism provided for the treadle 364. This mechanism comprises a clutch plate 500 having an opening 502 through which extends a vertical bar 504 pivotally mounted on the treadle 476 and extending upwardly therefrom. The forward portion of the plate 500 is mounted in the groove 444 in the standard 446 in the same manner as the clutch plate 432 and a spring 506 (Fig. 24) corresponding to the spring 450 is mounted in a socket (not shown) in the shelf 442 and urges the rear portion of the plate 500 upwardly to cause it to exert a clutching action on the bar 504. The clutch plate 500 is released concomitantly with the release of the plate 432 by the depression of the treadle 454 which imparts downward movement to the tube 468 thereby to break the clutching engagement of the plate 500 with the bar 504. Thereupon two springs 508 (Fig. 4) move the treadle link 478 upwardly to retract the shank wiper carriers 36 and 46.

For adjusting the wiper assemblies for operation on shoes of different sizes a hand wheel 510 (Fig. 1) is fixed to the forward end portion of a shaft 512 extending from front to back of the machine. Referring to Fig. 3, there is fixed to the shaft 512 a bevel gear 514 which meshes with a bevel gear 516 fixed to the shaft 408. Also fixed to the shaft 408 is a spur gear 518 which meshes with a like gear 520 fixed to the shaft 420. It will be seen that the operation of the hand wheel 510 causes equal and opposite rotation of the shafts 408 and 420 and the threaded end portions of the two shafts act on the levers 396 and 400 to cause equal and opposite movement of the slide 116 in the toe head and the slide 176 in the heel head. For adjusting the shank and side wiper assemblies toward and from each other a small bevel gear 522 is fixed to the left end portion of the shaft 408 and arranged to mesh with a relatively large bevel gear 524 fixed to the shaft 248. Referring to Fig. 4, the rotation of the shaft 248 by the operation of the hand wheel 510 causes the right and left screw threads in opposite end portions of said shaft to swing the levers 244 and 498 toward or from each other to impart equal and opposite movements to the shank and side wiper assemblies. The hand wheel is yieldingly held in adjusted position by a spring pressed detent 526 (Fig. 4) mounted in a suitable recess in an extension 528 of the crosshead 31 and arranged to operate in any one of a plurality of sockets formed in the margin of a disk 530 fixed to the shaft 512 (Fig. 2). To enable the operator to determine the adjustment of the wiper assemblies in terms of shoe sizes a pointer 532 (Fig. 2) is fixed to the slide 116 and arranged to register with a fixed scale 534.

The adjustment of the wipers by the hand wheel 510 so locates the toe wipers and the heel wipers relatively to each other lengthwise of the shoe that a shoe of the size indicated by the registration of the pointer 532 on the scale 534 is slightly shorter than the space lengthwise of the shoe between the toe and heel wipers. Thus the shoe may be moved downwardly onto the work supports without danger of abrasion of the extremities of the upper by contact with the wipers but with the assurance that the welt will remain on top of the wipers since the space between the ends of the last and the wiping edges of the wipers is too restricted to permit the combined thickness of the welt and the upper to pass downwardly between them. In the case of the shank wipers, however, this result cannot be achieved because the heightwise contours of the opposite sides of the shank portion of the shoe are such that the shank wipers 42 and 44 must be spaced from each other widthwise of the shoe to an extent substantially greater than the width of the shank portion of the shoe bottom to permit the shoe to move downwardly between them. For this reason it is desirable to hold the welted margin at opposite sides of the shank portion of the shoe in position to receive the shank wipers in the welt crease when the shoe is introduced into the machine. This may be accomplished manually by the engagement of the fingers of the operator with the outer edge face of the welt at opposite sides of the shank portion of the shoe and the bending of the welt upwardly to insure a proper entrance of the shank wipers into the welt crease, or it may be accomplished by the use of mechanical means such, for example, as the clip disclosed in United States Letters Patent No. 2,242,245, granted May 20, 1941, on an application filed in the name of Joseph Fausse. This clip has inturned end portions which engage the upper attaching face of the welt at opposite sides of the shank portion of the shoe and hold the welt in position for the entrance of the shank wipers into the welt crease. After introducing the shoe into the machine, the treadle 476 is depressed to impart a preliminary advancement to the shank wipers in order to bring them into position to support the welt at the shank portion of the shoe by engagement with its upper attaching surface. If a clip such as that disclosed in the Fausse patent is employed, the clip is removed from the shoe after such preliminary advancement of the shank wipers and thereupon the treadle 364 is depressed to overwipe the toe portion and the heel portion of the shoe and thereafter the treadle 476 is again depressed to effect the overwiping of the welted margin at opposite sides of the shank portion of the shoe. In the event that one of the shank wipers meets the resistance of the welted margin before the opposite wiper the crossbar 480 (Fig. 4) will swing as required to permit the advancement of the more remote wiper while the other wiper remains at rest. After a uniform pressure of the shank wipers in the opposite sides of the welted margin has been established, further depression of the treadle 476 causes the wipers to advance concomitantly to complete the overwiping of the welted margin at opposite sides of the shank portion of the shoe. Upon the completion of the overwiping operation the wipers remain in their advanced positions to support the welt while a sole is laid thereon and initially secured thereto by cement. Upon the completion of the sole laying operation the operator depresses the treadle 454 (Fig. 25) to release the clutch mechanisms which hold the treadles 364 and 476 in their respective depressed positions thus permitting the retraction of the wipers to their respective rest positions. It will be understood that the retraction of the wipers leaves the shoe free to be manually moved upwardly out of the machine.

While the illustrated machine is adapted to perform a lasting operation on a prewelt upper on which no previous shaping operation has been performed, it has been found that the lasting operation is greatly facilitated by the previous shaping of the end portions in a machine such, for example, as that disclosed in United States Letters Patent No. 2,359,762, granted October 10, 1944, on an application filed in the name of Eric A. Holmgren.

Having thus described my invention, what I claim as new and desire to secure by Letters Patent of the United States is:

1. In a lasting machine, toe lasting wipers, heel lasting wipers, side lasting wipers, and two flexible wiping members, one at each side of a shoe in the machine, extending substantially the full length of the shoe, and constructed and arranged to overwipe those portions of the lasting margin not overwiped by the wipers.

2. In a lasting machine, toe lasting wipers, heel lasting wipers, shank lasting wipers, flexible side lasting wipers extending substantially the full length of a shoe in the machine, carriers for the central portions of the side lasting wipers respectively, carriers for the toe end portions of the side wipers respectively, and carriers for the heel end portions of the side wipers respectively.

3. In a lasting machine, toe lasting wiper plates, heel lasting wiper plates, shank lasting wiper plates, flexible side lasting wiping means, and a carrier at each side of a shoe in the machine constructed and arranged to carry both the shank wiper plate and the flexible wiping means in superposed relation.

4. In a lasting machine, toe lasting wipers, heel lasting wipers, shank lasting wipers, flexible side lasting wipers extending substantially the full length of a shoe in the machine, a carrier at each side of the shoe constructed and arranged to carry both the shank wiper and the flexible side lasting wiper, carriers at the toe end of the shoe for the side wipers respectively, and carriers at the heel end of the shoe for the side wipers respectively.

5. In a lasting machine, a pair of toe lasting wiper plates constructed and arranged for bodily movement toward and from the toe end of a shoe in the machine and for closing movement, a pair of heel lasting wiper plates constructed and arranged for bodily movement toward and from the heel end of the shoe and for closing movement, side lasting wiper plates, flexible side lasting wiping means, and a carrier at each side of the shoe for carrying the side wiper plate and the flexible side wiping means.

6. In a lasting machine, a pair of toe lasting wipers, a pair of heel lasting wipers, a flexible side wiper at each side of a shoe in the machine, means constructed and arranged to mount the toe wipers and the toe end portions of the side wipers, means constructed and arranged to mount the heel wipers and the heel end portions of the side wipers, a shank wiper at each side of the shoe, and a carrier at each side of the shoe constructed and arranged to mount the shank wiper and the central portion of the side wiper.

7. In a lasting machine, the combination with toe lasting wiper plates angularly adjustable on an axis extending widthwise of a shoe in the machine and heel lasting wiper plates, of shank lasting wiper plates, flexible side lasting wiping means, a carrier constructed and arranged to carry both the shank wiper plate and the flexible wiping means at one side of the shoe, and a member in which the wiper carrier is mounted for angular adjustment on an axis extending widthwise of the shoe.

8. In a lasting machine, the combination with toe lasting wiper plates angularly adjustable on an axis extending widthwise of a shoe in the machine and heel lasting wiper plates, of shank lasting wiper plates, flexible side lasting wiping means, a carrier constructed and arranged to carry both the shank wiper plate and the flexible wiping means at one side of the shoe, a member in which the wiper carrier is mounted for angular adjustment on an axis extending widthwise of the shoe, and an actuator on which said member is mounted for adjustive movement heightwise of the shoe.

9. In a lasting machine, a rigid shank wiper plate, a side wiper including a member which can be flexed to alter the contour of the side wiper lengthwise of a shoe in the machine, said side wiper being arranged to extend both toewardly and heelwardly from the shank wiper plate, a wiper carrier, and a fastener for removably attaching both the shank wiper plate and the flexible side wiper to the carrier.

10. In a lasting machine, a shank wiper plate, a flexible side wiper extending both toewardly and heelwardly from the shank wiper plate, a wiper carrier, a fastener for removably attaching both the shank wiper plate and the flexible side wiper to the carrier, a toe wiper carrier having a way for slidably mounting an end portion of the flexible side wiper, and a heel wiper carrier having a way for slidably mounting an end portion of the side wiper.

11. In a lasting machine, a rigid shank wiper plate, and a side wiper including a member which can be flexed to alter the contour of the side wiper lengthwise of a shoe in the machine, said side wiper comprising a rear part lasting section, a forepart lasting section and an intermediate section which separates the other two sections substantially to the extent of the width of the shank wiper plate.

12. In a lasting machine, a shank wiper plate, a flexible side wiper comprising a rear part lasting section, a forepart lasting section and an intermediate section which separates the other two sections substantially to the extent of the width of the shank wiper plate, a wiper carrier, and a fastener for removably attaching the shank wiper plate and the intermediate section of the flexible side wiper to the wiper carrier.

13. In a lasting machine, a side wiper comprising a resiliently flexible channel shaped member, a plurality of wiper elements each having an angular shank portion fitted to said channel, and a retainer for holding the wiper elements in predetermined relation to each other and to said channel shaped member.

14. In a lasting machine, a side wiper flexible widthwise of the shoe in the machine and continuous from the toe end to the heel end of the shoe, a carrier in which said side wiper is mounted, an end wiper, and a carrier for said end wiper, said end wiper carrier being grooved to mount an end portion of said flexible side wiper in sliding engagement such that the end wiper carrier and the side wiper are free to move relatively to each other generally lengthwise of a shoe in the machine.

15. In a lasting machine, toe wiping means, heel wiping means, two shank wiper plates, one at each side of the shoe, and universally flexible side wipers extending in opposite directions from the shank wiper plates and having their opposite end portions constructed and arranged to extend beyond the end portions of a shoe in the machine.

16. In a lasting machine, the combination with a shank lasting wiper, of two independent flexible wiping means at opposite sides of a shoe, a carrier for the shank wiper and the flexible wiping means at each side of the shoe, and means mounting said carrier for adjustment on an axis extending widthwise of a shoe in the machine.

17. In a lasting machine, a side wiper flexible widthwise of a shoe in the machine and continuous from the toe end to the heel end of the shoe, a carrier in which said side wiper is mounted, means mounting said carrier for movement widthwise only of a shoe in the machine, an end wiper, and a carrier for said end wiper, said end wiper carrier having a groove in which an end portion of said flexible side wiper is freely mounted.

18. In a lasting machine, the combination with end wipers and flexible side wiping means, of a first carrier for said flexible side wiping means and a second carrier for said wipers and wiping means, and means mounting the second carrier for adjustment on an axis extending widthwise of a shoe in the machine.

19. A side wiper member having a central portion for mounting a shank wiper plate, and having a portion extending toewardly from said central portion nad characterized by a series of steps for mounting a series of side wiper plates, said steps each inclining longitudinally of the member and downwardly away from said central portion, the member being further characterized by a portion extending heelwardly from said central portion and having formed therein a series of steps each inclining longitudinally of the member and downwardly away from said central portion.

20. A side wiper member having a central portion constructed and arranged to be positioned in predetermined relation to a shank wiper plate, opposite portions extending from said central portion and constructed and arranged to mount a plurality of side wiper plates, said opposite portions each being constructed and arranged to slide freely in a way formed in a member constructed and arranged to mount said opposite portions of the member.

21. A resiliently flexible wiper member having a central portion and characterized by a series of steps extending toewardly from said central portion and constructed and arranged to mount a series of wiper plates in overlapping relation, said member being further characterized by a like series of steps extending heelwardly from said central portion.

22. A wiper member characterized by a series of contiguous inclined steps constructed and arranged to mount a plurality of side wiper plates in successively overlapping relation.

23. For mounting a plurality of wiper plates, a wiper member characterized by a series of steps inclined longitudinally of the member, each step having a riser the height of which corresponds substantially to the width of an edge face of a wiper to be mounted thereon.

24. For mounting a plurality of wiper plates, a wiper member characterized by a series of steps inclined longitudinally of the member, each step having a riser the height of which corresponds substantially to the width of an edge face of a wiper to be mounted thereon, the distance longitudinally of the wiper member between sucessive risers being less than the width of wiper plates to be mounted on said steps.

25. A resiliently flexible member characterized by a central portion and by the provision of recesses extending in opposite directions from said central portion, and a wall at the inner side recess characterized by a series of steps constructed and arranged to receive a series of side wiper plates in overlapping relation.

26. In a lasting machine, the combination with toe wipers and heel wipers of a resiliently flexible side wiper at each side of a shoe in the machine, a carrier at each side of the shoe constructed and arranged to mount the central portion of the side wiper, a member at each side of the shoe in which the side wiper carrier is mounted for angular adjustment on an axis extending widthwise of the shoe, a toe wiper carrier provided with ways in which the toe end portions of the side wipers are slidably mounted, and a heel wiper carrier having ways in which the heel and portions of the side wipers are slidably mounted.

27. In a lasting machine, the combination with toe wipers and heel wipers of a resiliently flexible side wiper at each side of a shoe in the machine, a carrier at each side of the shoe constructed and arranged to mount the central portion of the side wiper, a member at each side of the shoe in which the side wiper carrier is mounted for angular adjustment on an axis extending widthwise of the shoe, a toe wiper carrier provided with ways in which the toe end portions of the side wipers are slidably mounted, a heel wiper carrier having ways in which the heel end portions of the side wipers are slidably mounted, means mounting the heel wiper carrier for movement lengthwise of the shoe while holding said carrier against angular movement, a toe wiper head in which the toe wiper carrier is mounted for rectilinear movement, and means mounting the toe wiper head for angular movement on an axis extending widthwise of the shoe.

28. In a lasting machine, a lasting wiper comprising a plurality of metallic wiping elements and a resiliently flexible member in which said elements are mounted in permanently predetermined relation to each other, said member comprising channeled sections in which said wiper elements are mounted, and key sections fitted into said channeled sections and arranged to secure the wiping elements permanently in said member.

29. In a lasting machine, a lasting wiper comprising a plurality of metallic wiping elements, said elements having bent angular shank portions and mutually engaging wiper portions, and a resiliently flexible member in which the shank portions of the metallic wiping elements are permanently embedded.

30. In a lasting machine, a lasting wiper comprising a plurality of metallic wiping elements each of said elements having a bent angular shank portion, a resiliently flexible member, in which the shank portions of the metallic wiping elements are permanently embedded, a carrier on which said member is mounted, and means mounting said carrier for movement widthwise only of a shoe in the machine.

31. In a lasting machine, a lasting wiper comprising a plurality of overlapping wiping elements each of which is constructed and arranged to engage and to overwipe the lasting margin of a shoe upper, a resiliently flexible member in which said wiping elements are mounted, and a carrier for said member.

32. In a lasting machine, the combination with shoe supporting means of a flexible lasting wiper comprising a plurality of wiping elements each of which is constructed and arranged to engage and to overwipe the lasting margin of a shoe upper, a resiliently flexible member in which said wiping elements are mounted in permanently predetermined relation to each other, and a carrier for said member constructed and arranged for movement in predetermined relation to a shoe in the machine.

33. In a lasting machine, a plurality of wiper elements each of which comprises an upper engaging portion and a shank portion, and a resilient rubber member in which the shank portions of said wiper elements are embedded and from which the wiping portions of said elements project to form a substantially continuous wiping edge extending generally lengthwise of the rubber member.

34. In a lasting machine, a resiliently flexible lasting wiper comprising a channel shaped member, a plurality of wiper plates each having an angular shank portion fitted to the channel of said member, and a retainer formed to fit into said channel and provided with grooves constructed and arranged to receive the angular shank portions of the wiper plates and to locate said plates in predetermined relation to each other longitudinally of said channel.

35. In a lasting machine, a resiliently flexible lasting wiper comprising a channel shaped member of vulcanized rubber, a plurality of metallic wiper plates uniformly spaced relatively to each other longitudinally of said channel shaped member, each of said wiper plates having an angular shank portion fitted to said channel, and a retainer comprising a vulcanized rubber member constructed and arranged to fit into said channel and provided with grooves uniformly spaced from each other and arranged to register with the angular shank portions of the wiper plates.

36. In a lasting machine, a lasting wiper comprising a plurality of wiper plates, and a member in which said wiper plates are permanently mounted, said member being characterized by a wall having notches formed in its upper portion, each notch having a vertical surface which receives in abutting relation an edge face of a wiper plate and an inclined surface which engages the bottom face of the wiper plate.

37. In a lasting machine, a lasting wiper comprising a series of wiper plates in which each plate overlaps the next plate, and a member in which said wiper plates are permanently mounted, said member being characterized by a wall having formed in its upper portion a series of contiguous notches, each notch having a surface against which abuts an edge face of a wiper plate, and an inclined surface upon which lies the bottom face of the wiper plate.

38. In a lasting machine, a lasting wiper comprising a series of wiper plates in which each plate overlaps the next plate, and a member in which said wiper plates are permanently mounted, said member being characterized by a wall having formed in its upper portion a series of contiguous notches, each notch having a surface against which abuts an edge face of a wiper plate, and an inclined surface upon which lies the bottom face of the wiper plate, said inclined surface being substantially shorter in length than the width of the wiper plate.

39. In a prewelt lasting machine, a lasting wiper comprising a plurality of wiping elements each of which is constructed and arranged to engage and to overwipe the welted margin of a shoe upper, a resilient flexible member in which said wiping elements are mounted, and a spacer mounted on said flexible member and arranged to engage a portion of the upper adjacent to the welted margin.

40. In a prewelt lasting machine, a lasting wiper comprising a plurality of wiper plates each of which is constructed and arranged to engage and to overwipe the welted margin of a prewelt upper, a resilient flexible member in which said wiper plates are mounted, and a member removably mounted on the flexible member and constructed and arranged to engage a portion of the upper adjacent to its welted margin thereby to arrest the overwiping movement of the lasting margin.

41. In a lasting machine, end lasting wipers constructed and arranged for closing and opening movements, a work support constructed and arranged for movement heightwise of a shoe in the machine, a member on which both the wipers and the work support are mounted, means mounting the member for angular movement on an axis extending heightwise of a shoe in the machine, and an actuator for closing the wipers and for moving the work support heightwise of the shoe into supporting position.

42. In a lasting machine, a pair of toe wipers constructed and arranged for closing and opening movement, a toe rest constructed and arranged for movement heightwise of a shoe in the machine, a carriage on which both the wipers and the work support are mounted, a base plate mounting the carriage for tilting movement, means mounting the base plate for angular movement on an axis extending heightwise of a shoe in the machine, and an actuator for closing the wipers and for moving the toe rest heightwise of the shoe thereby to press the toe portion of the shoe against the wipers.

43. In a lasting machine, toe lasting wipers constructed and arranged for closing and opening movements, a toe rest constructed and arranged for movement heightwise of a shoe in the machine, a slide on which the wipers and the toe rest are mounted, means mounting the slide for movement generally lengthwise of a shoe in the machine, and an actuator for advancing the slide to bring the wipers into contact with the shoe and for thereafter closing the wipers and moving the toe rest heightwise of the shoe to press the shoe against the wipers.

44. In a lasting machine, a base plate mounted to swing on an axis extending heightwise of a shoe in the machine, a wiper head mounted in the base plate for tilting movement on an axis extending widthwise of the shoe, means mounting the head in the plate for bodily movement generally lengthwise of a shoe in the machine, and an actuator movable generally lengthwise of the shoe in a fixed path and constructed and arranged to advance the wiper head.

45. In a lasting machine, a base plate mounted to swing on an axis extending heightwise of a shoe in the machine, members mounted in ways in the base plate for sliding movement generally lengthwise of the shoe, a wiper head pivotally mounted on said members for tilting movement on an axis extending widthwise of the shoe, and means for moving the wiper head generally lengthwise of the shoe including a member constructed and arranged for sliding movement in a fixed path, said member having a concave abutment surface having curvatures common to the swinging axis and the tilting axis respectively.

46. In a lasting machine, a base member mounted to swing on an axis extending heightwise of a shoe in the machine, two slides mounted in ways in the base member for movement generally lengthwise of the shoe, a wiper head pivotally mounted on the slides for tilting movement on an axis extending widthwise of the shoe, an abutment member projecting from the wiper head, and means for advancing the wiper head including a member movable generally lengthwise of the shoe in a fixed path, said member having a concave abutment surface constructed and arranged to engage said abutment member, said abutment surface having the formation of an arc struck from the swinging axis and also the formation of an arc struck from the tilting axis.

47. In a lasting machine, a shank lasting wiper, a base plate on which the wiper is mounted, a top plate mounted on the wiper, a wiper carrier, means formed in the carrier for retaining the wiper, the base plate and the top plate in assembled relation to each other and to the carrier, and means for securing said parts together.

48. In a lasting machine, a shank lasting wiper provided with an open-ended slot, a base plate having a recess formed therein, a top plate having a hole formed therein, a wiper carrier, and a fastener extending through the hole in the top plate, the slot in the wiper and the recess in the base plate and clamping said plates to each other and to the carrier.

49. In a lasting machine, a shank lasting wiper provided with an open-ended slot, a base plate having a recess formed therein, a top plate having a hole formed therein, a wiper carrier, a fastener extending through the hole in the top plate, the slot in the wiper and the recess in the base plate and clamping said plates to each other and to the carrier, and means in the carrier for orienting the shank wiper and the plates relatively to each other and relatively to the carrier.

50. In a lasting machine, a shank lasting wiper provided with an open-ended slot, a base plate having a recess formed therein, a top plate having a hole formed therein, a wiper carrier, a fastener extending through the hole in the top plate, the slot in the wiper and the recess in the base plate and clamping said plates to each other and to the carrier, and a pin mounted in the carrier and arranged to register with the slot in the shank wiper and with recesses in said plates to effect the orientation of the wiper and the plates relatively to each other and relatively to the carrier.

51. In a lasting machine, shank lasting wipers, flexible side lasting wipers extending substantially the full length of a shoe in the machine, a carrier at each side of the shoe constructed and arranged to carry both the shank lasting wiper and the flexible side lasting wiper, carriers at the toe end of the shoe for the side lasting wipers respectively, and carriers at the heel end of the shoe for the side lasting wipers respectively.

References Cited in the file of this patent

UNITED STATES PATENTS

| Number | Name | Date |
|---|---|---|
| 212,460 | Graf | Feb. 18, 1879 |
| 337,925 | Chase | Mar. 16, 1886 |
| 391,467 | Gray | Oct. 23, 1888 |
| 435,888 | Ellithorp | Sept. 2, 1890 |
| 443,351 | Braggins | Dec. 23, 1890 |
| 505,671 | Norwood | Sept. 26, 1893 |
| 592,826 | Preston | Nov. 2, 1897 |
| 632,458 | Gare | Sept. 5, 1899 |
| 1,839,446 | Spalsbury et al. | Jan. 5, 1932 |
| 2,043,305 | Reed | June 9, 1936 |
| 2,087,241 | Bunker | July 20, 1937 |
| 2,173,980 | Pym | Sept. 26, 1939 |
| 2,249,647 | Dunn | July 15, 1941 |
| 2,362,059 | Eppler, Jr. | Nov. 7, 1944 |

FOREIGN PATENTS

| Number | Country | Date |
|---|---|---|
| 7,101 | Great Britain | of 1890 |
| 18,442 | Great Britain | of 1890 |